Aug. 28, 1951

E. C. THOMSON 2,566,260

ELECTRICAL CONTROL

Filed April 10, 1946

Inventor
E. CRAIG THOMSON

By James C. Hamilton
Attorney

Aug. 28, 1951  E. C. THOMSON  2,566,260
ELECTRICAL CONTROL
Filed April 10, 1946  3 Sheets-Sheet 2

Inventor
E. CRAIG THOMSON
By James C. Hamilton
Attorney

Patented Aug. 28, 1951

2,566,260

UNITED STATES PATENT OFFICE 2,566,260

ELECTRICAL CONTROL

Elihu Craig Thomson, Boston, Mass., assignor to Photoswitch, Incorporated, Cambridge, Mass., a corporation of Massachusetts Application April 10, 1946, Serial No. 660,899

6 Claims. (Cl. 323—50)

The present invention relates in general to electrical control devices, and in particular to a transformer in which the flow of power from the primary winding to the secondary winding is controlled by a circuit condition in an auxiliary secondary winding.

In many applications of electrical devices for the control of large power units in response to sensitive thermal switches, water level changes, or the like, it is desirable that the control device control a circuit having relatively large power flow in response to changes in a circuit having a relatively small voltage and current flow. Heretofore, the most practical of such control devices has involved the use of electron discharge devices such as vacuum tubes or gas tubes, the tube controlling a relay in response to a condition change in its grid circuit. Such devices are relatively expensive, require frequent attention to the tubes, which are delicate and susceptible of failure, and must be carefully constructed to be vibration and shock proof, and provided with special power supplies.

Prior devices to eliminate tubes in such applications have thus far required operating voltage of 40 or more volts in the control circuit, resulting in danger to those handling the control circuit and in the necessity for using high voltage insulation and construction techniques in order to comply with the specifications of The Underwriters' Laboratories, Inc.

This invention has for its principal object the provision of an electrical relay apparatus which can control large amounts of power in response to changes in a control circuit involving a small current flow at low voltages without the use of electron discharge tubes.

Another object of the invention is the provision of such relay apparatus that will function properly in response to a control circuit in which the open circuit control voltage is less than 30 volts, thereby permitting the use of low voltage construction, insulation and techniques as prescribed by The Underwriters' Laboratories, Inc.

Still other objects are the provision of an electrical relay of this character which is small, simple and inexpensive to construct, durable, and not affected by dust, moisture, or high ambient temperatures, and which requires a minimum of servicing attention, and can consequently be located in relatively inaccessible locations.

A further object is the provision of an electrical relay apparatus that can be used in applications where an electron tube amplifier has heretofore been necessary.

To accomplish these and other objects, the invention contemplates generally a three-legged transformer with a primary winding on one leg and a secondary winding on each of the other legs. To one secondary winding there is connected, in one embodiment of the invention, a relay of any well-known kind, while the other secondary winding, more properly termed the "control winding," may be in circuit with a condition-responsive switch such as a thermostat. With power applied to the primary winding, the secondary winding and its relay are energized when the control winding circuit is closed, and substantially de-energized when the control winding circuit is open. The transformer thus functions as a novel form of relay in which the control circuit voltage and the output or controlled circuit voltage are each independently variable with respect to the input or primary voltage. This novel transformer may be termed alternatively a "transformer relay" or a "control transformer," as desired. In the detailed description of other embodiments of the invention that follows, the term "control transformer" is used exclusively in order to avoid confusion with the ordinary relay that is illustrated in the controlled circuit, but it is intended to include the meanings of both terms.

The description refers to the drawings in which.

Figure 1:
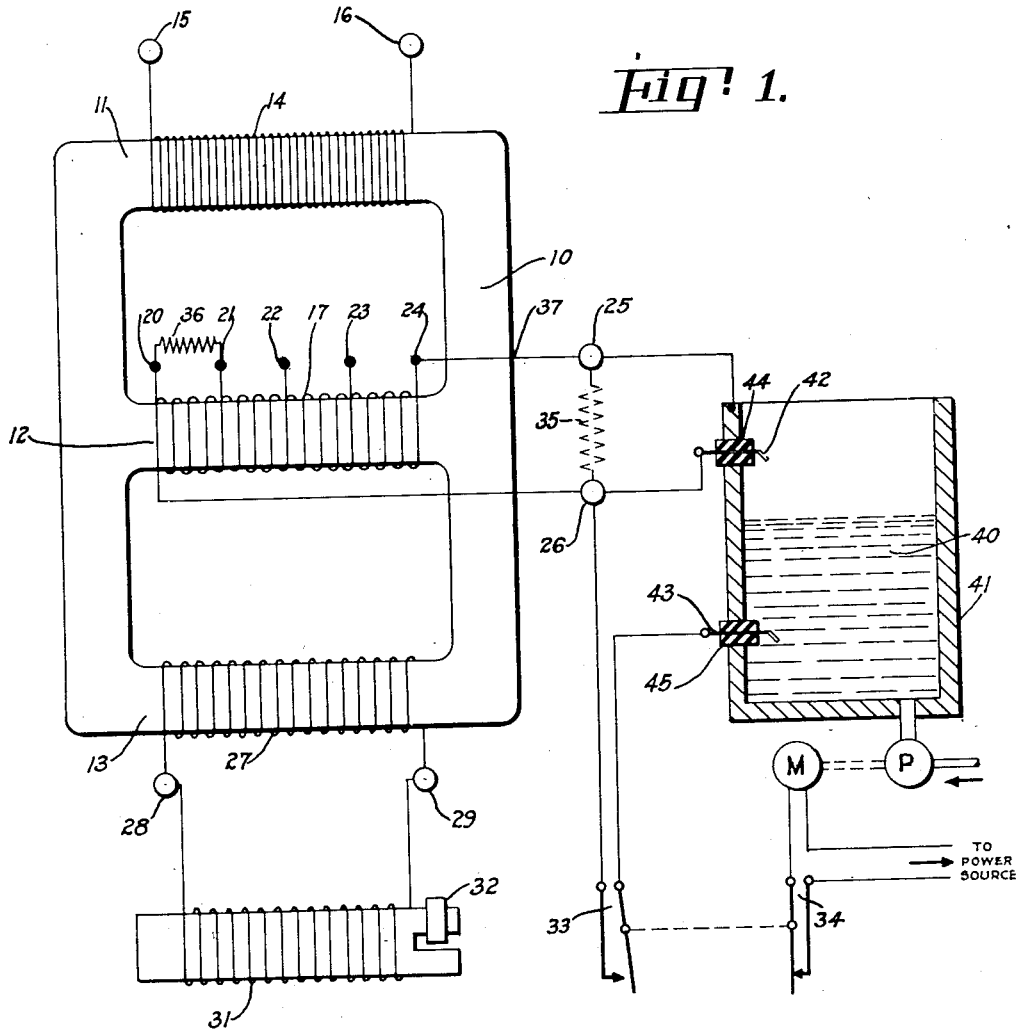
Fig. 1 illustrates partly in electrical scheme, partly in cross section and partly diagrammatically, an electrical control device of the invention as applied to the problem of controlling the level of a liquid in a tank.

In Fig. 1, a control transformer 10, constructed in accordance with the invention to function as an electrical relay, has a core of usual construction provided with three parallel-connected legs 11, 12, and 13. On the first leg 11 is wound a primary coil 14, adapted for connection to a source of alternating or otherwise varying current at terminals 15 and 16. On the second leg 12 is wound a control coil 17 having a plurality of spaced taps 20, 21, 22, 23 and 24, and a pair of end terminals 25 and 26. On the third and last leg 13 there is wound a secondary coil 27 having end terminals 28 and 29 for the connection thereto of any suitable device to be energized by the secondary. The order of arrangement of the three coils 14, 17 and 27 on the various legs 11, 12 and 13 is not important, but may be varied as desired. A relay 31 of usual construction for use with A. C. and having preferably a shading coil 32, is connected to the terminals 28 and 29 for energization by the secondary coil 27. As will follow below, the output circuit of the secondary coil can be adapted for operating D. C. relays in various fashions. The relay 31 operates switches 33 and 34 in response to a circuit condition existing at the control coil terminals 25 and 26, as will now be explained.

When power is applied to the primary winding 14, magnetic flux is set up in the core of the transformer 10 and tends to follow two distinct magnetic flux paths, the first including legs 11 and 12, and the second including legs 11 and 13. Assuming first that the control coil 17 is open circuited, that is, that there is substantially no connection from terminal 25 to terminal 26, the greater portion of this flux then follows the first path and is shunted around the third leg 13 by the second leg 12 for the reason that the secondary coil 27, having a closed circuit, provides reactive action upon the flux in its leg 13 while the control coil 17, being open circuited, provides little or no reactive action upon the flux in its leg 12. If now the circuit of the control coil 17 is closed, as by a suitable electrical connection from terminal 25 to terminal 26, this coil then provides a reactive action upon the flux in its leg 12 and a greater portion of the flux is diverted to the third leg 13 and the secondary coil 27, providing more power thereto and operating the relay 31.

By adjusting the flux in the legs 12 and 13 so that there is nearly but not quite enough flux in the secondary leg 13 to actuate the relay 31 when the control coil 17 is open circuited, the control transformer 10 can be made very sensitive to small current changes in the control coil circuit. One manner of doing this involves constructing the two core legs 12 and 13 of the predetermined relative cross-sections, but this is expensive and not adapted to various applications of the transformer. Another easier and less expensive method is to provide an initial reactive action on the flux in the second leg 12 by the control winding 17 by closing its circuit with a high resistance 35 (shown in dotted line) connected across the terminals 25 and 26. This permits an initial adjustment of the relative flux in each of the secondary legs 12 and 13 so that upon a further lessening of the impedance across the terminals 25 and 26, the relay 31 becomes actuated. It is more convenient, however, to connect this resistor across any pair of taps 20 to 24, inclusive, and accordingly the adjusting resistor 36 is shown connected from tap 20 to tap 21.

As illustrated in Fig. 1, the control transformer of the invention is applied to controlling the level of a liquid 40 in a container 41, here an electrically conductive container. A system of this nature, and other systems in which the invention may be substituted for an electron discharge tube, are illustrated in Patent No. 2,357,371 to Wm. F. Wolfner, 2d. A pair of conductive probes 42 and 43, defining two different heights of the liquid level, are mounted through a side of the container 41 in suitable insulators 44 and 45 to establish electrical contact with the liquid 40 when it is at the proper level. The top probe 42 is connected to one terminal 26 of the control coil 17, and the other terminal 25 is connected to the container 41. A pump P is provided to replenish the supply of liquid, which may be lost by evaporation, removal, or otherwise. This pump is driven by an electric motor M, the power circuit of which is controlled by the switch 34, which in turn is controlled by the relay 31 as aforementioned, and is normally closed when the relay is de-energized. The other switch 33 controlled by the relay 31 is normally open when the relay is de-energized, and connects together the two probes 42 and 43 when closed.

As shown in Fig. 1, the control coil 17 is open circuited, the relay 31 is de-energized, the switch 33 is open, switch 34 closed, and the pump P is pumping liquid into the container 41. When the liquid 40 reaches the top probe 42, electrical contact is made between the terminals 25 and 26 of the control coil 17 through the liquid 40, and the relay 31 is energized. As a consequence switch 33 closes, connecting together the two probes 42 and 43, and the switch 34 opens, thereby interrupting the circuit to the motor M and stopping the pump P. Thereafter the circuit of the control coil 17 remains closed and the relay 31 energized until the height of the liquid level falls below the bottom probe 43, breaking the circuit of the control coil 17. This de-energizes the relay 31, opens switch 33 and closes switch 34, to re-establish the condition illustrated in Fig. 1. Thus the invention functions as a differential level control similar to that illustrated in Fig. 3 of the aforementioned patent to Wolfner, 2d.

When the top probe 42 is exposed, a film of the liquid 40 may often adhere to the probe and its insulator 44 and provide a leakage path for current from the control coil 17, thus closing the circuit of that coil. Leakage of current in this fashion can be detrimental to the sensitivity of the control transformer if it is of appreciable quantity, as it will maintain the circuit of the control coil 17 closed when it should be open. Therefore, the taps 20 to 24, inclusive, are provided on the control coil 17, to any one of which the wire 37, connected at one end to the terminal 25, may be attached for reducing the voltage supplied by the control coil to a sufficiently low value to render such leakage ineffective. These taps 20 to 24, inclusive, may also be used for impedance matching purposes, where the controlling load has an appreciable impedance of its own.

The turns of the control coil 17 are preferably so related in number to the turns of the primary coil 14, however, that the open circuit voltage of the control 17 at the terminals 25 and 26 is always less than 30 volts, regardless of the choice of taps. Obviously a higher control circuit voltage can be used if desired, but with this invention a control circuit voltage of less than 30 volts under all conditions is easily obtained and used successfully. The voltage furnished by the secondary coil 27 may be stepped up or down with relation to the voltage applied to the primary coil 14, as desired, and the control transformer 10 may therefore function simply as a sensitive relay controlling a high voltage circuit in response to an electrically insulated low voltage circuit, or it may simultaneously raise or lower the output voltage.

In many installations the distance between the control transformer 10 and its associated apparatus and the container 41 is relatively great, perhaps fifty or one hundred feet. Heretofore it has been necessary, in order to comply with the specifications of The Underwriters' Laboratories, Inc., to use high voltage techniques and insulation in the interconnecting wiring, especially so where the liquid being supervised has a relatively low conductivity, like tap water. These techniques and insulation are expensive. With this invention, the wires interconnecting the control coil terminals 25 and 26 and the probes 42 and 43 and container 41 need have only low voltage insulation, even for materials of relatively low conductivity, resulting in lower installation cost and a saving in installation time with no sacrifice of safety. Further, since the open circuit voltage of the control coil 17 is less than 30 volts for materials of low conductivity, such as tap water, a man working at the container 41 or handling the probes is not in danger of death from electric shock, which danger has existed in the past.

Obviously, the wire which connects the container 41 to the control coil terminal 25 may be replaced by a pair of ground connections, one at the terminal 25 and one at the container 41; or, if the container be made of an electrically non-conductive material, a third probe similar to the two probes 42 and 43 may be added in a location below these two probes, preferably close to the bottom of the container, and this third probe may be grounded instead of the container, or connected to the control coil terminal 25 by a suitable low voltage connection, as is the container in Fig. 1. These variations are all very well known in the art, and are not deemed to merit specific illustration or further discussion.

In the applicant's copending application, Serial No. 602,590 filed June 30, 1945, now Patent No. 2,468,791, issued May 3, 1949, there is illustrated a conductivity control system employing electron discharge tubes in which system also the control transformer of the present invention may be substituted for the electron tubes in a similar manner as herein discussed to provide a tubeless electrical conductivity control system, without otherwise altering the nature of the system.

Obviously, a meter, or other electrically responsive device, may be substituted for the relay 31, and the control transformer 10 may be used in a system like that of Fig. 1 of the above-mentioned patent to Wolfner, 2d. In such a case, the resistor 36 should preferably be adjustable in order to provide a calibration adjustment for the meter.

The sensitivity of the invention may be further enhanced by the employment of a D. C. relay in place of the A. C. relay 31, as variously shown in Figs. 2, 3 and 4.

Figure 2:
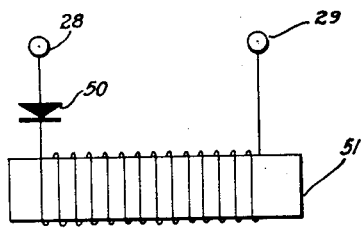
Figs. 2, 3 and 4 illustrate in electrical scheme alternative arrangements for the use of D. C. relays with the control apparatus of Fig. 1.

In Fig. 2, a rectifier 50 and D. C. relay 51 are series-connected to the secondary terminals 28 and 29, providing the full voltage of the secondary coil 27 (not shown) to the relay 51. If desired, a smoothing condenser (not shown) may be connected in shunt with the relay.

Figure 3:
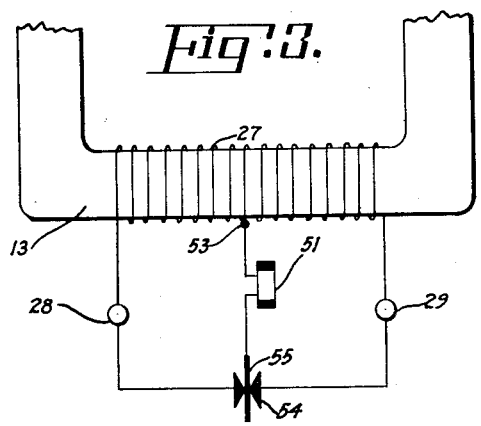

In Fig. 3, the lower portion of the transformer 10 is illustrated showing leg 13 and the secondary winding 27, now center-tapped at 53. A full-wave rectifier 54 is connected at its two positive terminals to the output terminals 28 and 29. The D. C. relay 51 is connected from the center tap 53 to the negative terminal 55 of the rectifier. This arrangement provides one-half the full voltage of the secondary winding 27 to the relay 51, but has the advantage of being a full-wave rectification system.

Figure 4:
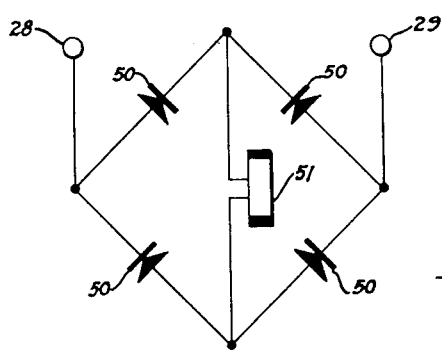

Fig. 4 is an arrangement having four rectifiers 50 in a bridge rectifier circuit of well-known form connected to the output terminals 28 and 29 for supplying the relay 51 with full voltage fully-rectified current from the secondary coil 27 (not shown).

Figure 5:
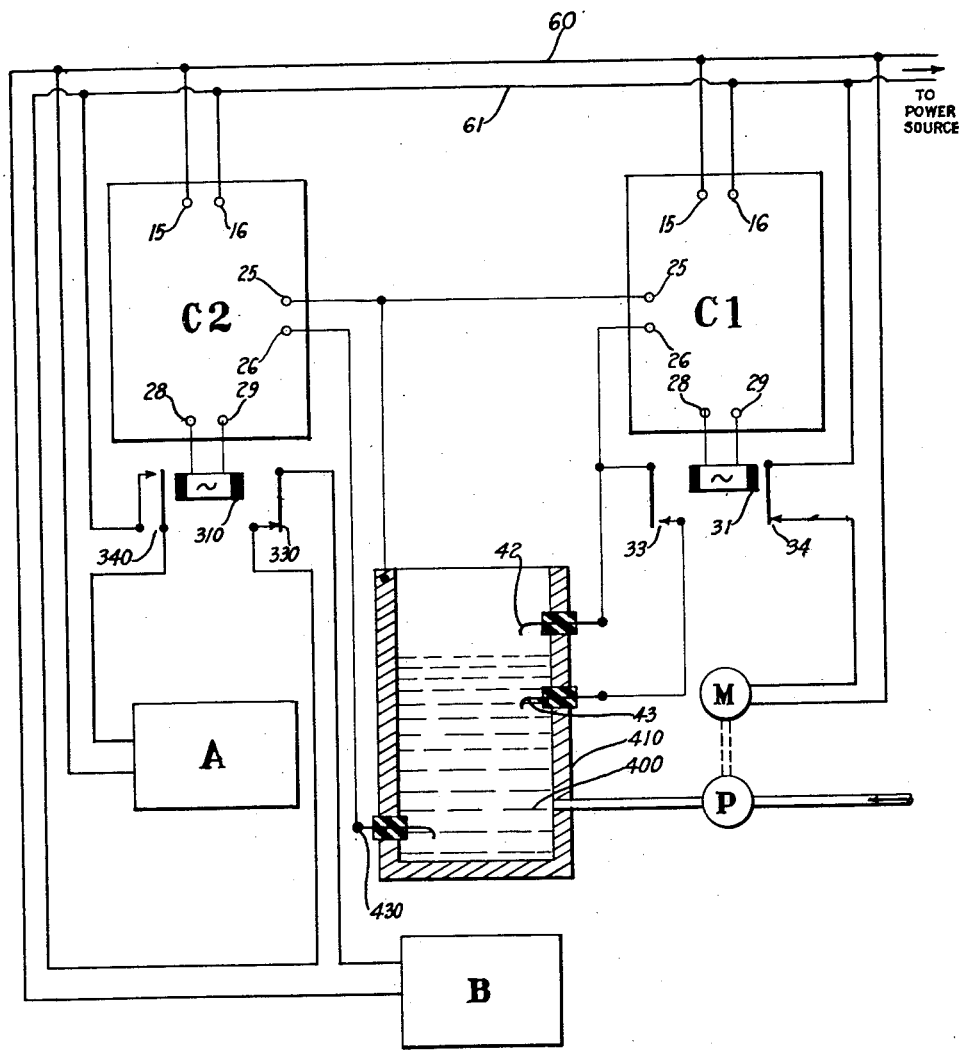
Fig. 5 illustrates diagrammatically the application of two control devices of the invention in a boiler feedwater safety control system.

In many industrial systems, a pair of control transformers constructed in accordance with the invention may be combined to provide a complete condition and safety control system. For example, in a boiler feedwater control system for apparatus employing heated water for heat or power transfer, it is desirous to maintain the level of the water between two predetermined heights, and to shut down the associated heating apparatus if the level falls below the lower of the two heights. Where the heating apparatus is an electrically operated gas or oil burner, one control transformer may be employed in a differential level control circuit as illustrated in Fig. 1 for supervising the water level, and a second similar transformer may be employed in a circuit that is responsive to the existence of a dangerously low water level for sounding an alarm and/or shutting down the burner if that level should be reached. A system broadly setting forth this concept as applied to electronic level-responsive controls is disclosed in the copending application of John A. Long, Serial No. 547,218 filed July 29, 1944. Fig. 5 illustrates another similar system employing two control transformers in accordance with the present invention to accomplish the same results without the use of electron discharge tubes.

In Fig. 5, a first control transformer C1, illustrated in block form but identical in all essential respects to the transformer 10 of Fig. 1, is employed in a differential level control circuit identical to that of Fig. 1 for the purpose of maintaining the level of water 400 in an electrically conductive boiler 410 between the heights defined by the two probes 42 and 43. Power is supplied to the transformer C1 and the motor M from general supply wires 60 and 61. A second control transformer C2, like the first transformer C1 in all essential respects, is employed in a circuit for controlling the power to an electrically operated fuel burner B and an alarm A in response to the existence of a dangerously low water level defined by a third and lowermost probe 430, which is like the other probes 42 and 43. During proper operation of the differential level control circuit and its members the third probe 430 is always immersed in the water 400, and the relay 310 of the second transformer C2 is thus normally always energized. This relay 310 becomes de-energized, however, when for any reason the level of the water 400 falls below the lowermost probe 430. Accordingly, the switch 340 (corresponding to the switch 34 of the relay 31) is normally open rather than closed, and the switch 330 is normally closed. The normally closed switch 330 is in series connection in the power circuit of the burner B, and maintains the burner operative as long as the relay 310 is energized, while the normally open switch 340 is in series connection in the power circuit of the alarm A (which may be a bell or a warning light), and simultaneously maintains that alarm inoperative. However, if the level of the water 400 falls below the height defined by the lowermost probe 430 and the relay 310 becomes de-energized, the normally closed switch 330 opens and interrupts the power to the burner B, and the normally open switch 340 closes and provides power to the alarm A. The relay 310 must eventually become de-energized if the motor M or pump P fails to function, or if the boiler 410 develops a dangerous leak, or if the second transformer C2 becomes inoperative, thus providing for safe failure against many contingencies.

Since additional changes not herein specifically referred to may be made in the above described article, and different embodiments of the invention could be made without departing from the scope thereof, it is intended that all matter contained in the above description or shown in the accompanying drawings shall be interpreted as illustrative only and not in a limiting sense.

What is claimed is:

1. An electrical control device comprising: a transformer core having first, second and third legs all magnetically connected in parallel to provide a first closed magnetic flux path including said first and third legs, and a second closed magnetic flux path, normally of considerably less reluctance than said first path, including said first and second legs; a primary winding on said first leg, adapted for connection to a source of alternating current for exciting magnetic flux in said core; a control winding on said second leg, adapted when shunted by a relatively low resistance to divert the major part of said flux to said first path; a pair of electrodes, adapted to be bridged by a conductive material, in circuit with said control winding; a series of taps on said control winding; a resistance element; and means for connecting said resistance element across a selected pair of said taps for the purpose of adjusting the flux distribution between said paths when said electrodes are unbridged.

2. An electrical control device comprising: a transformer core having first, second and third legs, all magnetically connected in parallel to provide a first closed magnetic flux path including said first and third legs, and a second closed magnetic flux path including said first and second legs; a primary winding on said first leg; a secondary winding on said third leg; a control winding on said second leg adapted, when shunted by a relatively low impedance to divert the major part of said flux to said first path; a pair of electrodes, adapted to be bridged by a conductive material, in circuit with said control winding; means for connecting said primary winding to a source of alternating current; and a resistance connected in parallel with said control winding for adjusting the distribution of said flux between said paths when said electrodes are unbridged.

3. An electrical control device comprising: a transformer core having first, second and third legs all magnetically connected in parallel to provide a first closed magnetic flux path including said first and third legs, and a second closed magnetic flux path, normally of considerably less reluctance than said first path, including said first and second legs; a primary winding on said first leg, adapted for connection to a source of alternating current for exciting magnetic flux in said core; a control winding on said second leg, adapted when shunted by a relatively low resistance to divert the major part of said flux to said first path; a variable impedance device, having a relatively low resistance in one condition and a relatively high impedance in another in series with said control winding; a series of taps on said control winding; and means for connecting a resistance across a selected pair of said taps for the purpose of adjusting the flux distribution between said paths when said variable impedance device is in said high impedance condition.

4. A device according to claim 3 wherein said core is of a "figure eight" shape, the outer ends constituting said first and third legs and said second leg forming the central cross-piece.

5. An electrical control device comprising: a transformer core having first, second, and third legs, all magnetically connected in parallel to provide a first closed magnetic flux path including said first and third legs, and a second closed magnetic flux path including said first and second legs; a primary winding on said first leg; a second winding on said third leg; a control winding on said second leg adapted, when shunted by a relatively low impedance, to divert the major part of said flux to said first path; a variable impedance device, having a relatively low impedance in one condition and a relatively high impedance in another, in series with said control winding; means for connecting said primary winding to a source of alternating current; and a resistance connected in parallel with said control winding for adjusting the distribution of said flux between said paths when said variable impedance device is in said high impedance condition.

6. A device according to claim 5 wherein said core is of a "figure eight" shape, the outer ends constituting said first and third legs and said second leg forming the central cross-piece.

E. CRAIG THOMSON.

REFERENCES CITED

The following references are of record in the file of this patent:

UNITED STATES PATENTS

| Number | Name | Date |
|---|---|---|
| 1,306,525 | Cole | June 10, 1919 |
| 1,784,205 | Seeger | Dec. 9, 1930 |
| 2,001,557 | Von Ohlsen | May 14, 1935 |
| 2,078,479 | Briggs | Apr. 27, 1937 |
| 2,078,688 | Sauer | Apr. 27, 1937 |
| 2,110,313 | Warrick | Mar. 8, 1938 |
| 2,364,532 | Huge | Dec. 5, 1944 |

FOREIGN PATENTS

| Number | Country | Date |
|---|---|---|
| 96,238 | Austria | Mar. 10, 1924 |